United States Patent [19]

Yokokawa et al.

[11] 4,094,949

[45] June 13, 1978

[54] METHOD FOR PREPARING SHAPED ARTICLES OF A FLUORINATED ELASTOMER

[75] Inventors: Kiyoshi Yokokawa; Noboru Shimamoto, both of Annaka, Japan

[73] Assignee: Shin-Etsu Chemical Co. Ltd., Tokyo, Japan

[21] Appl. No.: 690,971

[22] Filed: May 28, 1976

[30] Foreign Application Priority Data

Jun. 9, 1975 Japan ............................... 50-69303

[51] Int. Cl.$^2$ ............................................. C08F 29/22
[52] U.S. Cl. ......................................... 264/234; 260/900; 264/230; 264/236; 264/347; 264/DIG. 71
[58] Field of Search .............. 264/234, 95, 236, 347, 264/230, DIG. 71; 260/900

[56] References Cited

U.S. PATENT DOCUMENTS

| | | | |
|---|---|---|---|
| 3,417,176 | 12/1968 | Anderson et al. | 264/230 |
| 3,452,126 | 6/1969 | Sieron | 264/236 |
| 3,560,595 | 2/1971 | Phillips et al. | 260/900 |
| 3,597,372 | 8/1971 | Cook | 264/230 |
| 3,701,702 | 10/1972 | Shichman et al. | 264/236 |
| 3,769,371 | 10/1973 | Nersasian | 260/900 |
| 3,864,228 | 2/1975 | Rossetti, Jr. | 260/900 |
| 3,899,807 | 8/1975 | Sovish et al. | 264/230 |

*Primary Examiner*—Jeffery R. Thurlow
*Attorney, Agent, or Firm*—Toren, McGeady & Stanger

[57] ABSTRACT

A fluorinated elastomer is blended with a poly(vinylidene fluoride) resin at a temperature between the temperature of 70° C below the melting temperature of the resin and the decomposition temperature of the same resin to form a resin blend capable of giving shaped articles having superior mechanical strengths. The resin blend is suitable for preparing heat-shrinkable articles like heat-shrinkable tubes by heating with expansion by internal pressure at an elevated temperature higher than the melting temperature of the resin, followed by cooling without release of the pressure to room temperature where the pressure is released. Such heat-shrinkable tubes can readily become shrunken by re-heating.

9 Claims, No Drawings

METHOD FOR PREPARING SHAPED ARTICLES OF A FLUORINATED ELASTOMER

BACKGROUND OF THE INVENTION

This invention relates to a novel and improved method for the preparation of shaped articles of a fluorinated elastomer or, in particular, of shaped articles of a fluorinated elastomer with high mechanical strengths and excellent heat-shrinkability.

Fluorinated elastomers are very valuable because of their high heat stability and resistance against chemicals and are widely employed in diversified industrial fields, such as, the manufacture of vehicles, aircraft, electric appliances and the like. Shaped articles from conventional fluorinated elastomers are, however, not always satisfactory in their mechanical strengths, especially, at elevated temperature. The mechanical strength, for example, the elongation, tends to decrease markedly after prolonged exposure to high temperatures. Therefore the temperature range in which they can be used is disadvantageously limited.

Methods for preparing polymer blends have been proposed to overcome the above disadvantages of the fluorinated elastomers. For example, a rubber blend is obtained by blending a fluorinated elastomer with various elastomeric polymers, such as, synthetic rubbers of acrylonitrile and butadiene and silicone rubbers with or without fluorine-substituted organic groups. Improvement of some of the properties of the fluorinated elastomers may be achieved by the method of rubber blending. However, satisfactory results with respect to the mechanical properties due to poor affinity between the fluorinated elastomer and the elastomeric polymers have not been obtained.

Alternatively, a resin blend of a fluorinated elastomer has been proposed by cold-milling with a poly(vinylidene fluoride) resin and other optional ingredients (see, for example, U.S. Pat. No. 3,769,371). The resin blend thus obtained is found somewhat superior compared to the abovementioned rubber blends in the stability of the mechanical properties, especially elongation, on prolonged exposure to an elevated temperature even though their electric properties and mechanical properties themselves are rather poor.

Further, heat-shrinkable shaped articles based on a fluorinated elastomer may be prepared by a method, in which the fluorinated elastomer is blended with various kinds of thermoplastic resins into a resin blend, and the resin blend is molded into a shaped article under stretching and cooled before the stretching force is released. The shaped articles made of such resin blends are inferior in heat stability and resistance against chemicals inherent in the fluorinated elastomer itself along with somewhat decreased mechanical strengths.

It may be added that heat-shrinkable articles having satisfactory properties have hitherto been thought not to be obtainable from a resin blend composed of a fluorinated elestomer and a poly(vinylidene fluoride) resin (see British Pat. No. 1,250,503).

SUMMARY OF THE INVENTION

The present invention has been completed as a result of the extensive investigations undertaken by the inventors to solve the above described problems.

An object of the invention is to provide a method for the preparation of articles having excellent mechanical strengths from a resin blend of a fluorinated elastomer with a poly(vinylidene fluoride) resin.

Another object of the invention is to provide a method for the preparation of a heat-shrinkable articles from a resin blend of a fluorinated elastomer with a poly(vinylidene fluoride) resin.

The method of the invention comprises the steps of (a) mixing a poly(vinylidene fluoride) resin with a fluorinated elastomer at a temperature between the temperature 70° C below the melting temperature of the poly(vinylidene fluoride) resin and the decomposition temperature of the same resin to form a homogeneous resin blend, (b) adding a curing catalyst to the resin blend after cooling followed by mixing together, and (c) shaping the resin blend into an article with heating the elastomer to cure. The thus shaped articles can further be processed into heat-shrinkable articles by heating under forced deformation at a temperature not lower than the melting temperature of the resin, followed by cooling as such to a temperature not exceeding 100° C at which temperature the deforming force is released.

DETAILED DESCRIPTION OF THE PREFERRED EMBODIMENTS

To describe the invention in further detail, the fluorinated elastomers employed in the method of the present invention are exemplified by the copolymers of vinylidene fluoride-hexafluoropropylene, vinylidene fluoride-hexafluoropropylene-tetrafluoroethylene, tetrafluoroethylene-propylene and vinylidene fluoride-trifluorochloroethylene, alone or in mixtures of two or more. The poly(vinylydene fluoride) resin to be blended with the fluorinated elastomer, on the other hand, is obtained by the polymerization of vinylidene fluoride or copolymerization of a monomer mixture composed mainly of vinylidene fluoride with one or more comonomers. As the comonomers copolymerizable with vinylidene fluoride are mentioned vinylidene halides other than vinylidene fluoride, such as, vinylidene chloride and vinyl halides, such as, vinyl fluoride and vinyl chloride. The poly(vinylidene fluoride) resin has a melting temperature ranging from 130° to 195° C as measured by the DTA (differential thermal analysis) method. These resins are commercially available in the form of pellets of, for example, a few millimeters in dimensions or very fine powders with a particle size of some tenths of a micrometer.

The poly(vinylidene fluoride) resin is blended with the fluorinated elastomer in accordance with this invention in an amount of from 5 to 300 parts by weight or, preferably, more than 50 parts by weight and less than 200 parts by weight per 100 parts by weight of the elastomer. If the amount of the resin is smaller than the above range, the mechanical properties of the resultant shaped articles are inferior while, on the other hand, too much of the resin over the above range leads to decreases in the rubberlike elasticity of the articles.

An unexpectedly remarkable advantage can be obtained by the relatively high loading of the poly(vinylidene fluoride) resin, say, more than 50 parts by weight per 100 parts by weight of the elastomer in the resin blend; that is an improvement in the mechanical strengths of the resultant shaped articles. For example, the highest tensile strength achieved by the method is about 280 kg/cm$^2$, which is about twice that achieved with unloaded fluorinated elastomer, compared to the prior art resin-elastomer blend in general where a tensile strength higher than 1.5 times that of the unloaded base elastomer can rarely be obtained.

Moreover the elongation and tear strength of the articles in accordance with the method of the present invention are very large with sufficiently high tensile strength, notwithstanding the general trend in the prior art that tensile strength and elongation are compensatory for each other.

Further advantageously, the accuracy in dimensions and outer appearance of the shaped articles of the present invention are excellent and the processing of the articles into heat-shrinkable articles is very much facilitated by large elongation at an elevated temperature owing to a very good adhesive contact between the matrix of the elastomer and the finely dispersed particles of the resin.

Additionally, any kinds of the poly(vinylidene fluoride) resins can be utilized in the method of the present invention in much larger amounts than in the prior art methods, irrespective of their particle size and melting temperature. This contributes also to the improved anti-solvent resistance and reduced cost of the shaped articles.

The mixing machines by which the fluorinated elastomer is blended with the poly(vinylidene fluoride) resin are not limited specifically insofar as blending performance is possible at an elevated temperature. They can be any of the types conventionally employed in the rubber technology, including roller mills, internal mixers, Banbury mixers, kneaders, continuous mixers and the like.

The temperature at which the blending is performed is limited specifically to between the temperature 70° C or, preferably, 40° C below the melting temperature of the poly(vinylidene fluoride) resin and the decomposition temperature of the resin. The melting temperatures of commercially available poly(vinylidene fluoride) resins differ widely from one to another, but the blending temperature lower than the above range does not give a satisfactorily homogeneous blend of the elastomer and resin, leading to blistering as well as inferior mechanical properties of the resultant articles. Too high a temperature naturally brings about the decomposition of the resin.

It should be noted that, when the resin blend is intended to be fabricated into heat-shrinkable articles, for example, tube, the temperature of blending is preferably above the melting temperature of the resin in order to attain sufficient deformation of the resin blend, as is further explained hereafter.

The homogeneity of the resin blend is of essential significance. When the poly(vinylidene fluoride) resin has a sufficiently small particle size as fine as, say, some tens of micrometer or smaller, a satisfactorily homogeneous blend can be obtained by merely dispersing the resin into the matrix of the elastomer. On the contrary, when the resin is of the pellet form having a coarser particle size of, for example, 1 mm or larger, the resin particles must be first disintegrated into fine particles by the shearing force with the blending machine and then dispersed homogeneously into the matrix of the elastomer. It is a generally accepted trend that particles coarser than, say, 50 μm in diameter behave as a foreign substance in a matrix of a rubber-like elastomer exhibiting undesirable effects on the properties of the elastomer. Accordingly, the blending time necessary for obtaining a sufficiently homogeneous dispersion of the resin in the matrix of the elastomer depends upon various factors including the particle size distribution and melting temperature of the resin, the temperature at which the blending operation is performed and the type of the blending machine. In general, from 10 to 100 minutes of blending can give satisfactory results.

In practicing the blending of the resin with the elastomer in accordance with the method of the present invention, it is recommendable that the elastomer is first masticated on a cold roller mill, then the resin is added to the thus masticated elastomer and blended in cold or at a temperature below the melting temperature of the resin, for example, below 100° C, and thereupon the mixture is blended thoroughly at an elevated temperature in the range as specified above or, preferably, above the melting temperature of the resin into a homogeneous resin blend, followed by cooling to a temperature below, say, 100° C or, preferably, 80° C and adding a curing catalyst and mixing them together. If the blending is carried out from the beginning on a mixing machine heated above the melting temperature of the resin as is taught in the prior art disclosed in, for example, U.S. Pat. No. 3,597,372 or British Pat. No. 1,010,064, troubles are encountered, especially when the resin is in finely divided powder form, in that the resin particles tend to agglomerate or the softened resin sticks throughout on the hot surface of the mixing machine.

It is also recommended that, prior to the addition of the curing catalyst, the resin blend is filtered by being extruded by an extruder machine through a strainer provided with one or more screens having 60 to 200 mesh openings at a temperature from 100° to 140° C in order to obtain a more homogeneous resin blend, which will give shaped articles further improved properties. This process of filtration is important especially when heat-shrinkable articles are intended.

As the curing catalyst suitable in the resin blend in accordance with the method of the present invention are employed amine compounds, such as, N, N'-dicinnamylidene-1,6-hexanediamine, hexamethylenediamine dicarbamate and 4,4-bis(aminocyclohexyl) methyl carbamate, organic peroxides, such as, 2,4-dichlorobenzoyl peroxide and dicumylperoxide, and combinations of a trialkylamine and ethylene-bisthioglycolate or $\alpha$, $\eta$-polymethylenediol. Among the above mentioned catalysts, the most preferred is N, N'-dicinnamylidene-1,6-hexanediamine from the stand point of the workability of the resin blend. The amount of the curing catalyst to be added to the resin blend is from 0.5 to 10 parts by weight per 100 parts by weight of the fluorinated elastomer. The curing catalyst is added to the resin blend at a temperature in the range from 30° to 120° C or, preferably, from 40 to 100° C, since a homogeneous dispersion of the catalyst cannot be achieved rapidly at temperatures below 30° C, while satisfactory blending is also difficult at temperatures above 120° C due to partial curing reaction having already taken place during the blending operation. It is also possible that the curing of the fluorinated elastomer is effected by irradiation with ionizing radiation, such as, $\beta$- or $\eta$-rays even in the absence of any curing catalyst above-mentioned.

The resin blend to be shaped into articles in accordance with the method of the present invention is composed essentially of a fluorinated elastomer, a poly(vinylidene fluoride) resin and curing catalyst, and optionally various additives. Such additives include inorganic fillers exemplified by carbon black, finely divided silica, titanium dioxide, clay, diatomaceous earth, talc, mica powder, calcium carbonate and the like, acid acceptors exemplified by magnesium oxide, lead oxide, calcium oxide and the like, plasticizers exemplified by low molecular weight fluorinated elastomers and fluorine-containing silicone fluids, lubricants exemplified by higher fatty acids, e.g., stearic acid, metallic soaps, e.g., calcium stearate, higher paraffins, higher alcohols, higher amines, waxes, and the like, and coloring agents exemplified by various kinds of organic and inorganic pigments. These additives are added to the resin blend together with or before the addition of the curing catalyst at a temperature in the range, for example, from 30° to 150° C on the blending machine.

The resin blend prepared as above is then shaped into articles of desired form by conventional molding means, such as, compression molding, transfer molding, injection molding, extrusion molding and calendering. The temperature of molding is in the range from 70° to 200° C depending on the composition of the resin blend and the molding means.

Particularly in case of compression molding, transfer molding or injection molding, and where large amounts of the poly(vinylidene fluoride) resin are used, it is preferred to carry out the molding and curing at a temperature above the melting temperature of the resin. The articles shaped by extrusion molding or calendering are then subjected to curing in an atmosphere of steam or hot air under pressure. According to the method of the present invention, the curing in an atmosphere of hot air is preferably carried out under pressure of up to 5 kg/cm$^2$G by increasing the temperature stepwise, beginning with 70° to 200° C over a period of several hours for the purpose of preventing the blistering and deforming of the articles and obtaining cured articles having particularly high elongation.

The mechanical properties and anti-solvent resistance of the shaped articles can further be improved by heat treatment at a temperature from 180° to 250° C for 4 to 48 hours, if necessary.

Heat-shrinkable molded articles, for example, heat-shrinkable tubes can be obtained with the same resin blend in accordance with the method of the present invention. Tubes of the resin blend shaped by extrusion molding are subjected to mechanical stretching or expansion by increasing the inner pressure with an inert fluid at a temperature in the range from the melting temperature of the resin to 280° C, to enlarge their diameter by several times, followed by release of the stretching force or the expanding pressure after cooling of the tube to a temperature of 100° C or below, preferably to room temperature.

When the temperature at which the stretching or expansion is carried out is lower than the above range, an excessively large force or high pressure is required to give intended stretching or expansion, while higher temperatures than 280° C result in the decomposition of the resin blend, leading consequently to the blistering and rupture of the tube due to the decreased mechanical strengths of the tube in hot.

The temperature at which the resin and the elastomer have been blended into the resin blend is especially important when the resin blend is intended to be fabricated into heat-shrinkable tubes. It is preferred that the temperature is above the melting temperature of the resin because, if not, the tube is likely to rupture at least partly under stretch or expansion.

The heat-shrinkable articles or tubes thus prepared shrink immediately on re-heating to a temperature higher than the melting temperature of the resin, and the shrinked articles are very stable showing substantially no spontaneous shrinkage even after a prolonged storage at temperatures below 100° C or at room temperature.

The following examples will illustrate the method of the present invention but do not limit the scope of the invention. In the examples, parts are all parts by weight. Further, in the examples the testing methods for determining the mechanical properties were the same as given in JIS (Japanese Industrial Standard) K 6301 and the other properties, i.e., swelling, retention of stretching and incompleteness of shrinkage, were determined as follows.

Swelling: Volume increase in % of a test piece determined after immersion in the solvent (methylethylketone or toluene) at 23° C for 24 hours.

Retention of stretching: The sheet product was cut to make test pieces of dumbell shape (No. 2 type) as speicfied by the above-mentioned JIS. In the middle of each test piece were drawn two parallel lines 2 cm apart. The test pieces were heated in an air oven at 200° C for about 15 minutes to be softened and, thereupon, subjected to stretching by 200% as measured for the elongated distance between the two lines, at which elongation the test pieces were held by jigs and cooled as such to room temperature. Then each test piece was released from the jig and kept standing for 1,000 hours, whereupon the distance between the two lines was measured. Thus, the ratio of an increase in the distance between the lines after 1,000 hours of standing over 2 cm to an increase in the distance between the lines under forced stretching over 2 cm is expressed in % as the retention of stretching.

Incompleteness of shrinkage: The test piece after the measurement of the retention of stretching was heated at 200° C for 3 minutes to effect shrinkage and the increment of the distance between the lines over 2 cm was expressed in % as the value of incompleteness of shrinkage.

EXAMPLE 1.

Four resin blends were prepared by blending 100 parts of a fluorinated elastomer (Viton B-50, product by E. I. du Pont de Nemours) with each of 10, 20, 30 and 55 parts of a poly(vinylidene fluoride) resin having a melting temperature of 170° C (KF Polymer #1000 Powder, product by Kureha Chemical Co.) having a particle size distribution of 20 to 200 μm in the following manner.

The elastomer and the resin were first milled in a hot two-roller mill with the surface temperature of from about 65° C to above 90° C and, when the elastomer became to adhere on the rollers, the rollers were cooled with water over a period of 30 minutes, at the end of which the temperature of the blend was found to have increased slightly. The blend was next charged to a kneader heated at 210° C and blended well for 30 minutes. It was found that when the blending was performed at room temperature, no homogeneous dispersion of the resin into the matrix of the elastomer was obtained. The resin blend was filtered by being extruded with a rubber extruder through stainless steel screens with 60 mesh and 100 mesh openings kept at 100° C. It was found that when the resin blend prepared at a relatively low temperature was filtered, the screens became broken.

To each of the resin blends above obtained were added 10 parts of carbon black (Thermax MT, product by Vanderbilt Co.), 15 parts of magnesium oxide (Kyowamag 40, product by Kyowa Chemical Co.), and 3 parts of N, N'-dicinnamylidene-1,6-hexanediamine (Diak No. 3, product by E. I. du Pont de Nemours) per 100 parts of the fluorinated elastomer, and the mixture was thoroughly blended in a roller mill at 70° to 100° C for 30 minutes.

The resin blend thus prepared was shaped into sheet of 2 mm thick by heating at 160° C for 40 minutes under a pressure of 150 kg/cm². These sheets were then subjected to heat treatment in an oven of the hot-air circulation type at 200° C for 24 hours to completely cure.

The properties of the thus cured sheets are shown in Table I.

For comparison, two experiments were undertaken, in one of which the employment of the poly(vinylidene fluoride) was omitted and in the other of which the blending was performed at 70° C for 40 minutes. The properties of the sheets obtained by these comparative experiments are also shown in the same table.

To each of the resin blends obtained above were added the same carbon black, magnesium oxide and N-N'-dicinnamylidene-1,6-hexanediamine each in the same amounts as in Example 1 and, in addition, 1 part of Vitax (product by E. I. du Pont de Nemours) as a processing aid per 100 parts of the fluorinated elastomer, and the mixture was thoroughly blended in a roller mill at 70° to 100° C for 30 minutes.

The resin blend thus prepared was molded into tubes by extrusion through a metal die of 6 mm in inner diameter and 7 mm in outer diameter mounted on the nozzle of an extruder machine. The tubes were then cured in an air oven by stepwise heating initially at 100° C for 1 hour, then at 125° C for 1 hour and finally at 150° C for 1 hour, followed by heat treatment at 200° C for 20 hours. The properties of the thus cured tubes are shown in Table II.

The cured tubes were heated as inserted in stainless steel tubes of 16 mm in inner diameter kept in an air oven at 200° C for 30 minutes and expanded by compressing air into the tubes to a pressure of 2 kg/cm²G at the same temperature, followed by cooling as such to room temperature, where the pressure was released to give heat-shrinkable tubes. The heat-shrinkable tubes exhibited good heat-shrinkability when re-heated in an air oven at 200° C for 10 minutes almost to the dimensions before expansion.

Further, the heat-shrinkable tubes obtained by Experiments 8 and 10 above, when re-heated at the varying temperatures ranging from 100° to 200° C as indicated in Table III for 5 minutes, exhibited heat-shrinkability as shown in the table.

Table I

| | Experiment No. | | | | | |
|---|---|---|---|---|---|---|
| | 1 | 2 | 3 | 4 | 5* | 6* |
| Fluorinated elastomer parts | 100 | 100 | 100 | 100 | 100 | 100 |
| Poly(vinylidene fluoride)resin, parts | 10 | 20 | 30 | 55 | 0 | 20 |
| Temperature of blending, ° C | 210 | 210 | 210 | 210 | 210 | 70 |
| Blending time, minutes | 30 | 30 | 30 | 30 | 30 | 40 |
| Hardness | 73 | 86 | 84 | 91 | 74 | 72 |
| Tensile strength, kg/cm² | 181 | 198 | 225 | 236 | 144 | 129 |
| Elongation, at break, % | 340 | 300 | 285 | 225 | 227 | 139 |
| Elastic resilience, % | — | — | 16 | — | 12 | — |
| Swelling in methylethylketone, % | 312 | 286 | 229 | 166 | 286 | — |
| Swelling in toluene, % | 4 | 5 | 4 | 2 | 7 | — |
| Retention of stretching, % | 25 | 55 | 82 | 91 | 5 | — |
| Incompleteness of shrinkage, % | 2 | 2 | 2 | 2 | 1 | — |

*For comparison.

EXAMPLE 2

Six resin blends were prepared each with 100 parts of the same fluorinated elastomer as used in Example 1 and 30 parts of the same poly(vinylidene fluoride) resin as in Example 1 in the same manner as in Example 1 except that the surface temperature of the hot two-roller mill was about 65° C, instead of the range from about 65 to about 90° C and that the temperature of blending was 180°, 220° or 260° C, or 80°, 120° or 150° C for comparison as indicated in Table II, instead of 210° C.

Table II

| | Experiment No. | | | | | |
|---|---|---|---|---|---|---|
| | 7 | 8 | 9 | 10* | 11* | 12* |
| Temperature of blending, ° C | 180 | 220 | 260 | 80 | 120 | 150 |
| Appearance of resin blend | Brown, homogeneous | Dark brown, homogeneous | Dark brown homogeneous | Inhomogeneous | Inhomogeneous | Partly inhomogeneous |
| Screens after filtration | Partly broken | O.K. | O.K. | Broken | Broken | Broken |
| Inner diameter of tube, mm | 6.3 | 6.3 | 6.3 | 6.2 | 6.1 | 6.2 |
| Appearance of tube | Smooth | Smooth | Smooth | Rugged | Rugged | Rugged |
| Density, g/cm³ | 1.91 | 1.91 | 1.91 | 1.91 | 1.91 | 1.91 |
| Hardness | 78 | 78 | 78 | 76 | 76 | 78 |
| Tensile strength, kg/cm² | 198 | 226 | 224 | 108 | 110 | 151 |
| Elongation at break, % | 376 | 383 | 381 | 178 | 196 | 268 |
| Swelling in toluene, % | 9 | 9 | 9 | 9 | 9 | 9 |
| Swelling in methylethylketone, % | 261 | 262 | 258 | 284 | 282 | 255 |
| Expansion by inner pressure | Partly ruptured | O.K. | O.K. | Ruptured | Ruptured | Ruptured |
| Inner diameter: Before shrinkage of tube, mm : After shrinkage | 14.4 6.6 | 14.4 6.5 | 14.5 6.5 | — — | — — | — — |

Table II-continued

| | Experiment No. | | | | | |
|---|---|---|---|---|---|---|
| | 7 | 8 | 9 | 10* | 11* | 12* |
| Shrinkage, % | 54 | 55 | 55 | — | — | — |

*For comparison

Table III

| | Pre-heating temperature, °C | | | | | | | | |
|---|---|---|---|---|---|---|---|---|---|
| | 100 | 120 | 140 | 150 | 160 | 170 | 180 | 190 | 200 |
| Sample from Experiment No. 8: | | | | | | | | | |
| Inner diameter of the tube before shrinkage, mm | 13.7 | 13.7 | 13.7 | 13.7 | 13.7 | 13.7 | 13.7 | 13.7 | 13.7 |
| Inner diameter of the tube after shrinkage, mm | 12.7 | 12.4 | 11.7 | 11.3 | 11.2 | 10.6 | 8.7 | 6.6 | 6.5 |
| Percent shrinkage, % | 7.3 | 9.1 | 13.9 | 16.5 | 18.3 | 22.3 | 36.5 | 51.8 | 52.2 |
| Relative shrinkage, % | 14.0 | 17.5 | 26.7 | 31.7 | 35.0 | 42.7 | 70.0 | 99.3 | 100 |
| Sample from Experiment No. 10: | | | | | | | | | |
| Inner diameter of the tube before shrinkage, mm | 13.1 | 13.1 | 13.1 | 13.1 | 13.1 | 13.1 | 13.1 | 13.1 | 13.1 |
| Inner diameter of the tube after shrinkage, mm | 11.8 | 11.6 | 11.0 | 10.7 | 10.4 | 9.8 | 8.2 | 6.6 | 6.5 |
| Percent shrinkage, % | 9.9 | 11.7 | 16.0 | 18.3 | 20.6 | 25.8 | 37.0 | 49.6 | 50.3 |
| Relative shrinkage, % | 19.8 | 23.5 | 32.1 | 36.6 | 41.2 | 51.5 | 74.0 | 99.2 | 100 |

Note: Relative shrinkage is the ratio of the percent shrinkage at each re-heating temperature to the percent shrinkage at 200° C.

EXPERIMENT 3

Experiments were undertaken in the same manner as in Example 2, using three kinds of resin blends, in which the poly(vinylidene fluoride) resin was KF Polymer #100 of pellet form (product by Kureha Chemical Co.) and 30 parts each of the resin was blended with 100 parts each of the fluorinated elastomer at 180°, 220° or 260° C. The results are summarized in Table IV. It may be added that when the temperature was lower than 100° C, no homogeneous resin blend was obtained even by very prolonged mixing.

Table IV

| | Experiment No. | | |
|---|---|---|---|
| | 13 | 14 | 15 |
| Temperature of blending, °C | 180 | 220 | 260 |
| Appearance of resin blend | Partly inhomogeneous | Dark brown homogeneous | Dark brown homogeneous |
| State of screen after filtration | Totally broken | O.K. | O.K. |
| Inner diameter of tube, mm | 6.3 | 6.3 | 6.3 |
| Appearance of tube | Rugged | Smooth | Smooth |
| Density, g/cm³ | 1.90 | 1.91 | 1.91 |
| Hardness | 78 | 78 | 79 |
| Tensile strength, kg/cm² | 182 | 216 | 218 |
| Elongation at break, % | 350 | 375 | 370 |
| Swelling in toluene, % | 9 | 9 | 8 |
| Swelling in methyethylketone, % | 268 | 266 | 263 |
| Expansion by inner pressure | Ruptured | O.K. | O.K. |
| Inner diameter of tube, mm: | | | |
| Before shrinkage | — | 14.5 | 14.5 |
| After shrinkage | — | 6.5 | 6.5 |
| Shrinkage, % | — | 55 | 55 |

EXAMPLE 4

Experiments were undertaken in the same conditions as in Example 3 except that the poly(vinylidene fluoride) resin used was Kynar 201 powder (product by Pennwalt Inc.) The particle size distribution of the resin was in the range from 0.4 to 0.6 μm as measured by electronmicroscopy and the melting temperature of the resin as measured by the DTA method was about 151° C. Blending of the resin and the elastomer at room temperature was impossible, and no satisfactory resin blend could be obtained. The results of the experiments are summarized in Table V.

Table V

| Experiment No. | 16 | 17 | 18 | 19 | 20 | 21 |
|---|---|---|---|---|---|---|
| Temperature of blending, °C | 80 | 120 | 150 | 180 | 220 | 260 |
| Appearance of resin blend | Milky white | Milky white | Ivory homogeneous | Brown homogeneous | Dark brown, homogeneous | Dark brown, homogeneous |
| Filtration by screens | O.K. | O.K. | O.K. | O.K. | O.K. | O.K. |
| Inner diameter of tube, mm | 8.3 | 8.3 | 6.9 | 7.1 | 7.0 | 7.0 |
| Appearance of tube | Rugged | Rugged | Smooth | Smooth | Smooth | Smooth |
| Density, g/cm³ | 1.90 | 1.90 | 1.91 | 1.91 | 1.91 | 1.91 |
| Hardness | 82 | 80 | 83 | 81 | 81 | 82 |
| Tensile strength, kg/cm² | 172 | 193 | 244 | 231 | 238 | 240 |
| Elongation at break, % | 351 | 385 | 482 | 462 | 468 | 458 |
| Swelling in toluene, % | 5 | 4 | 4 | 4 | 4 | 4 |
| Swelling in methylethylketone, % | 275 | 261 | 274 | 260 | 260 | 258 |
| Expansion by inner pressure | Partly ruptured | Partly ruptured | O.K. | O.K. | O.K. | O.K. |
| Inner diameter of tube, mm : before shrinkage | 14.2 | 14.3 | 14.5 | 14.4 | 14.4 | 14.4 |
| : after shrinkage | 8.5 | 8.5 | 7.0 | 7.2 | 7.1 | 7.1 |
| Shrinkage, % | 40 | 41 | 52 | 50 | 51 | 51 |

EXAMPLE 5

Thermal behavior of the cured articles prepared in accordance with the method of the present invention was examined for the cured tubes obtained in Experiments No. 16 and No. 20. The tubes were subjected to aging at 200° or 250° C for 100 hours, after which tensile strength and elongation were measured, while the tensile strength and elongation of the unaged tubes were measured at an elevated temperature of 100°, 150° or 200° C. The results are shown in Table VI.

Table VI

|  | Sample from Exp. 16 | | Sample from Exp. 20 | |
| --- | --- | --- | --- | --- |
|  | Tensile strength, kg/cm$^2$ | Elongation at break, % | Tensile strength, kg/cm$^2$ | Elongation at break, % |
| After aging at 200° C | 182 | 302 | 243 | 419 |
| After aging at 250° C | 178 | 294 | 202 | 393 |
| Measured at 100° C | 72 | 255 | 68 | 258 |
| Measured at 150° C | 36 | 254 | 53 | 318 |
| Measured at 200° C | 15 | 165 | 20 | 220 |

EXAMPLE 6

Resin blends were prepared with 100 parts each of the same fluorinated elastomer as in Example 1 and the varying amounts as indicated in Table VII of the same Kynar 201 powder resin as used in Example 4 by blending them together first at room temperature and then at 180° C for 30 minutes in a 1-liter pressure kneader to give resin blends. Each resin blend thus prepared was filtered through a 30-mm rubber extruder having a die provided with screens of 60 and 100 mesh openings under a temperature gradient of 80° to 120° C. After cooling, the resin blend was admixed with the same amounts of the same additives including the curing catalyst as in Example 2 by milling in a 6-inch mixing roller at 70° to 120° C for 30 minutes. The resulting resin blend was shaped and processed into heat-shrinkable tubes similarly as before. The properties of the thus obtained heat-shrinkable tubes are shown in the table. For control, similar data determined for the tubes of the same fluorinated elastomer with use of no or excessive poly(vinylidene fluoride) resin are given in the same table.

Table VII

|  | Experiment No. | | | | | | | |
| --- | --- | --- | --- | --- | --- | --- | --- | --- |
|  | 22 | 23 | 24 | 25 | 26 | 27 | 28 | 29 |
| Amount of resin, parts | 0 | 30 | 40 | 55 | 70 | 100 | 200 | 300 |
| Density, g/cm$^3$ | 1.91 | 1.90 | 1.89 | 1.88 | 1.86 | 1.86 | 1.83 | 1.81 |
| Hardness, JIS | 69 | 79 | 84 | 86 | 88 | 92 | — | — |
| Hardness, Shore Durometer Type D | 27 | 32 | 35 | 38 | 41 | 45 | 64 | 66 |
| Tensile strength, kg/cm$^2$ | 154 | 209 | 217 | 220 | 198 | 213 | 267 | 276 |
| Elongation at break, % | 378 | 439 | 440 | 417 | 377 | 317 | 433 | 473 |
| Tear strength, kg/cm* | 45 | 63 | 110 | 119 | 136 | 171 | 197 | 239 |
| Swelling in methylethylketone, % | 348 | 289 | 241 | 209 | 172 | 116 | 73 | 55 |
| Swelling in toluene, % | 4 | 6 | 6 | 5 | 5 | 4 | 0.5 | 0.2 |
| Retention of stretching, % | 5 | 88 | 91 | 93 | 95 | 95 | 97 | 97 |
| Incompleteness of shrinkage, % | 1 | 1 | 2 | 3 | 3 | 2 | 4 | 6 |

*Measured for the test pieces cut from a sheet obtained by press cure at 175° C for 30 minutes under 150 kg/cm$^2$, followed by post curing at 200° C for 20 hours.

What is claimed is:

1. A method for preparing a heat-shrinkable article from a resin blend of a fluorinated elastomer and a poly(vinylidene fluoride) resin which comprises the steps of
    (a) mixing from 50 to 200 parts by weight of the poly(vinylidene fluoride) resin with 100 parts by weight of the fluorinated elastomer at a temperature between the melting temperature of the poly(vinylidene fluoride) resin and the decomposition temperature of the same resin to form the resin blend,
    (b) adding a curing catalyst to the thus formed resin blend,
    (c) shaping the resin blend into an article,
    (d) heating the article under forced deformation at a temperature not lower than the melting temperature of the resin to effect curing, and
    (e) cooling the article as such to a temperature below 100° C at which the deforming force is released.
2. The method as claimed in claim 1, wherein step (a) is preceded by the mixing of said resin and said elastomer at a temperature below the melting temperature of said resin.
3. The method as claimed in claim 1, wherein step (b) is carried out at a temperature below 120° C.
4. The method as claimed in claim 1, wherein the resin blend prepared in step (a) is filtered through a mesh screen prior to step (b).
5. The method as claimed in claim 1, wherein said curing catalyst is N,N'-dicinnamylidene-1,6-hexanediamine.
6. The method as claimed in claim 1, wherein said curing catalyst is added in an amount from 0.5 to 10 parts by weight per 100 parts by weight of said fluorinated elastomer.
7. The method as claimed in claim 1, wherein the shaped article is cured by heating in an atmosphere of air at a temperature ranging from 70° to 200° C.
8. The method as claimed in claim 7, wherein the cured shaped article is further subjected to heat-treatment at a temperature from 180° to 250° C for 4 to 48 hours.
9. The method of claim 1 wherein the elastomer is selected from the group consisting of copolymers of vinylidene fluoride-hexafluoropropylene, vinylidene fluoride-hexafluoropropylene-tetrafluoroethylene, tetrafluoroethylene-propylene, and vinylidene fluoride-trifluorochloroethylene alone or in mixtures of two or more.

* * * * *